United States Patent [19]

Kotzin

[11] Patent Number: 5,455,962
[45] Date of Patent: Oct. 3, 1995

[54] PERFORMANCE THROUGH HALF-HOPPING AND SPATIAL DIVERSITY

[75] Inventor: Michael D. Kotzin, Buffalo Grove, Ill.

[73] Assignee: Motorola, Inc., Schaumburg, Ill.

[21] Appl. No.: 253,828

[22] Filed: Jun. 3, 1994

Related U.S. Application Data

[63] Continuation of Ser. No. 762,148, Sep. 19, 1991, abandoned.

[51] Int. Cl.$^6$ ........................................................ H04Q 7/22
[52] U.S. Cl. ........................ 455/33.1; 455/52.1; 455/56.1; 375/202
[58] Field of Search ........................... 455/33.1, 33.2, 455/33.3, 50.1, 51.1, 56.1, 62, 54.1, 54.2, 52.1, 52.3, 13.3; 375/1, 202, 201; 370/95.3

[56] References Cited

U.S. PATENT DOCUMENTS

| | | | |
|---|---|---|---|
| 4,425,639 | 1/1984 | Acampora et al. | 455/13.3 X |
| 4,697,260 | 9/1987 | Grauel | 455/54.1 |
| 5,042,082 | 8/1991 | Dahlin | 455/33.2 |
| 5,095,535 | 3/1992 | Freeburg | 455/65 |

OTHER PUBLICATIONS

Yasushi Yamao & Yoshinori Nagao; Predictive Antenna Selection Diversity (PASD) for TDMA; IEEE Int'l Conf. on Comm. 1991, 46.4.1 pp. 1480–1484.

Yoshihiko Akaiwa, Antenna Selection Diversity for Framed Digital Signal Transmission in Mobile Radio; IEEE Vehicular Tech. Conf. 1981, vol. 2, pp. 470–473.

Daniel R. Tayloe, Space Diversity Hopper for Digital Data Transmission, Motorola Technical Developments, Mar. 1990, vol. 10, pp. 62–63.

*Primary Examiner*—Edward F. Urban
*Assistant Examiner*—Philip J. Sobutka
*Attorney, Agent, or Firm*—Richard Sonnentag

[57] ABSTRACT

A cellular communication system (50) is offered wherein communicated signals are exchanged on an indexed uplink communication resource and a non-indexed downlink communication resource. The non-indexed downlink communication format allows communication units to identify proximate service providers without knowledge of the index algorithm. The indexed signal transmitted by a user communication unit improves noise immunity in a signal transceived on the uplink. Signal quality is improved on the downlink through the use of selectable diversity antennas (22 or 23).

21 Claims, 1 Drawing Sheet

U=UPLINK
D=DOWNLINK

PERFORMANCE THROUGH HALF-HOPPING AND SPATIAL DIVERSITY

This is a continuation of application Ser. No. 07/762,148, filed Sep. 19, 1991 and now abandoned.

FIELD OF THE INVENTION

This invention relates to communication systems and more specifically to cellular communication systems.

BACKGROUND OF THE INVENTION

Cellular communication systems are known. Such systems are, typically, comprised of a number of cells, each having a service coverage area, and a number of cellular telephones (communication units). The service coverage areas of adjacent cells may be arranged to partially overlap in such a manner as to provide a substantially continuous coverage area in which a communication unit receiving service from one cell may be handed off to an adjacent cell with no interruption in service. The Groupe Special Mobile (GSM) Pan-European digital cellular system, as specified in GSM recommendations available from the European Telecommunications Standards Institute (ETSI) and incorporated herein by reference, is an example of just such a system.

A cell's radio coverage is provided by a base transceiver station (BTS). Each BTS may contain one or more transceivers (TRX) which can simultaneously receive on one frequency and transmit on another. Communication between a BTS and a mobile communication unit (or mobile station) (MS) typically occurs using a portion of a pair of frequencies (transmit and receive) temporarily assigned in support of the communication transaction at the BTS.

The pair of frequencies assigned for use at the remote site are typically referred to as a radio channel. Downlink transmissions (from BTS to MS) on the radio channel occur on a first frequency of the pair of frequencies. Uplink transmissions (from MS to BTS) on the radio channel occurs on the second frequency of the pair of frequencies.

The GSM system is a TDM/TDMA system providing eight full duplex signal paths (8 TDM slots per TDM frame) on each radio channel. A single, primary radio channel assigned to a BTS, by virtue of its being time multiplexed, can support up to seven full rate duplex traffic users (speech or data) in addition to a multiplexed common control channel within the eight TDM slots. Additional, secondary radio channels assigned to the same cell can provide a full complement of eight full rate traffic users (in the 8 TDM slots) per radio channel, since the control channel within the primary radio channel can control allocation of communication resources on secondary radio channels.

Transmissions (control or speech and/or data traffic) from a BTS to an MS, on the downlink, occupy a first TDM slot (downlink slot) on a first frequency of a radio channel and transmissions from a communication unit to a BTS, on the uplink, occupy a second TDM slot (uplink slot) on the second frequency of the radio channel. The uplink slot on the second frequency is displaced in time three TDM slot positions following the downlink slot on the first frequency. The uplink slot on the second frequency is offset 45 MHz lower in frequency than the downlink. The uplink slot and downlink slot (together providing a two-way signal path for a single user) may be referred to as a "communication resource", allocated by the BTS to an MS for exchanging signals. The term "communication resource" also typically includes an associated signalling channel, as for example the GSM specified slow associated control channel used with traffic channels.

Exchanges of paging and setup control information within GSM between MSs and BTSs typically occurs on the common control channel (CCCH) which occupies at least one slot of a primary channel of the BTS. Transmitted by the BTS on the CCCH are distinctive identification signals as well as synchronization and timing information common to all other frequencies and slots of the BTS. CCCH information allows an MS to differentiate between primary and non-primary channels.

Upon activation, an MS scans a set of frequencies in search of CCCH identification signals transmitted from proximate BTSs. Upon detecting a CCCH identification signal the communication unit measures a signal quality factor (such as signal strength) of the identification signal as a means of determining relative proximity of the BTS. Upon completing the scan of frequencies within the set, the MS generally selects the BTS providing the largest relative signal quality factor as a serving BTS. Upon identifying, and locking onto a suitably strong signal (and registering if necessary) the communication unit monitors the selected CCCH for incoming calls. Should the communication unit desire to initiate a call, an access request may be transmitted using the CCCH of the serving BTS.

During normal operation (including during active calls), the MS monitors for, identifies, and measures primary channels of nearby BTSs. If involved in an active call, the MS relays measurement information back to the base site on an associated signaling channel. Through such a process, it is possible for the MS to maintain an association with the most appropriate (proximate) BTS. The process may entail an autonomous switching by the MS to a different BTS, causing perhaps a re-registration by the MS with the system indicating that such a switch has occurred. Alternatively, during an active communication exchange, the MS may be commanded by the system to handover to a more appropriate BTS.

The GSM system specification allows for frequency hopping of the radio channel. Under frequency hopping in GSM, the exchange of communicated signals between the BSS and MS occurs on an indexed frequency which indexes after each TDM frame. As is known, the combination of frequency hopping, in conjunction with error correction coding techniques, results in a significant improvement in reception quality and improved interference robustness due to reduced radio channel fading and noise.

It is necessary, and it is so specified for GSM (see GSM Recommendation 5.02, Section 6.2.4), that the downlink frequency of the primary radio channel for each BTS be non-hopping. A non-hopping primary channel is necessary so that the CCCH of the downlink primary radio channel can act as the beacon for cell selection and measurement by the MS. The need for a beacon represents a significant disadvantage to cells with limited channel availability since it not only imposes a requirement that the CCCH not hop, but likewise imposes a similar requirement on the other seven slots of the primary radio channel.

Non-hopping CCCHs are a serious detriment to systems that are intended for use with low power portable radios. In order to accommodate low power subscriber units, cell spacings of such systems tend to be small. A minimal number of radio carriers are allowed to accommodate the typical capacity requirements of such small areas because of the small service coverage areas and relatively few subscribers. Thus, a relatively high proportion of carriers in the system are used as primary radio channels, and therefore are non-hopping. Low power subscriber units as a consequence do not benefit from the improvements provided by frequency hopping.

A need exists for a method of allowing the use of frequency hopping within cells having a single primary channel while still providing an MS beacon. Such a method would provide at least some of the signal quality benefits of frequency hopping to primary radio channels without diminishing the ability of the MS to easily detect, measure signal strength, and identify nearby BTSs. Such a method would offer the immunity to noise and fading of frequency hopping while preserving the desirable system control attributes inherent with GSM.

SUMMARY OF THE INVENTION

A cellular communication system is offered having a number of base sites, each with a service coverage area. At least one base site, of the number of base sites, and at least one communication unit located within the service coverage area of the at least one base site have means for exchanging communicated signals on an indexed uplink and a non-indexed downlink. The downlink communication signal may be utilized as a beacon for subscribers so they can continuously identify and establish relative proximity to other base sites. Performance balance between the uplink and downlink paths is maintained by utilizing a downlink transmit diversity technique with feedback.

BRIEF DESCRIPTION OF A PREFERRED EMBODIMENT

The solution to the problem of applying frequency hopping within GSM while still allowing mobile subscribers to detect nearby base sites lies, conceptually, in a half-hopping format wherein the uplink is maintained on a frequency hopping format while the downlink does not hop. The frequency hopping uplink (indexed uplink) achieves the noise immunity of frequency hopping communication systems. The non-hopping downlink (non-indexed downlink) allows a mobile subscriber to detect, and measure, the signals of nearby base stations.

Figure 1:
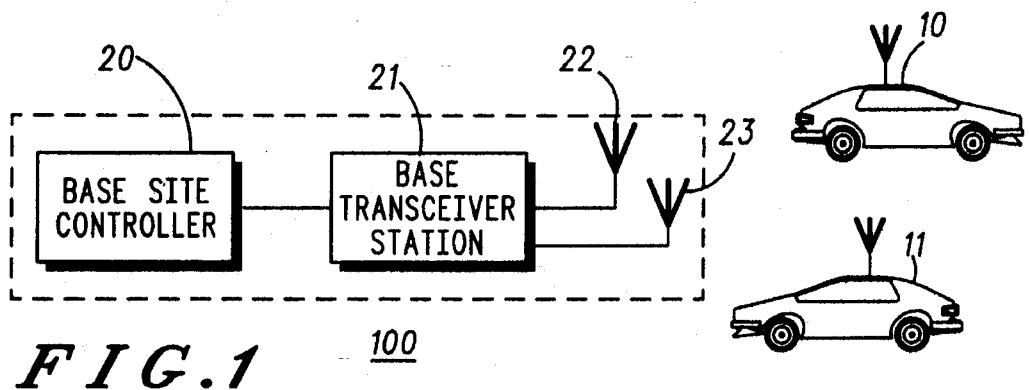
FIG. 1 comprises a simplified block diagram, according to the invention, of a base station system (BSS) and two mobile subscribers (MS).
Figure 2:
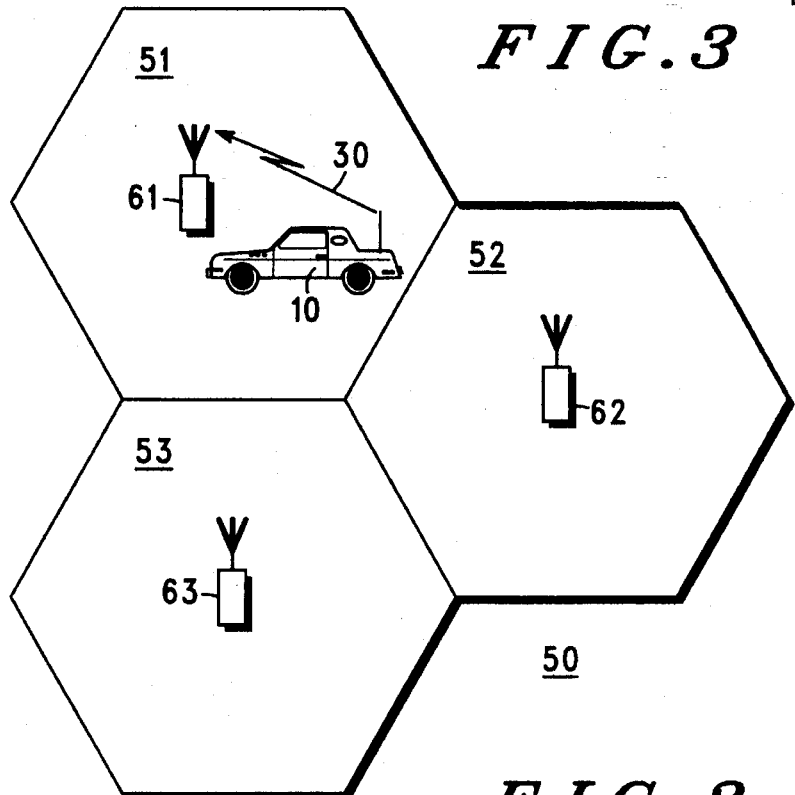
FIG. 2 depicts a communication system, according to the invention, having three service coverage areas and an mobile subscriber.

Shown within dotted lines of FIG. 1 is a base station system (BSS) (100) generally in accordance with the invention. Included within such a BSS (100) is a base site controller (BSC) (20) and base transceiver stations (BTS) (21) with diversity antennas (22 and 23). Also shown (FIG. 1) are mobile stations (MS) (10 and 11) (as used herein "mobile station" and "mobile subscriber" refer to mobile communication units or portable communication units). The BSC (20) may control additional BTSs (not shown) which serve other cells (other sectors at the same site or cells at remote locations). In conjunction with a mobile switching center (not shown), one or more BSSs (100) may provide communication services throughout a relatively large geographic area (50, FIG. 2) through a number of BTSs (21) distributed throughout the geographic area (50). In such a case each BTS (21) offers communication services within a service coverage area (51, 52 and 53) covering a portion of the large geographic area (50). Communication services offered within the relatively small geographic areas (51, 52 and 53) are provided through BTSs (21) located at base sites (61, 62 and 63) centrally located within the small service coverage areas (51, 52 and 53). (BTSs (21) located at base sites (61, 62 and 63) will hereinafter be individually referred to as BTS 61, BTS 62 and BTS 63.) Each BTS may have one or more radio transceivers.

In accordance with the teachings of the invention, BTSs (61, 62 and 63), and MSs (10 and 11) exchange communicated signals on a communication resource including a frequency indexed uplink and a non-indexed downlink. The communicated signal transferred on the indexed uplink by a MS (10 or 11) to a proximate BTS on an indexed carrier frequency is transmitted under the control of the proximate BTS.

In a first embodiment, a BTS (61) having a single transceiver is described. Since only a single transceiver is provided, the transceiver serves the primary channel function of transmitting an identification signal on a CCCH within a single slot of a primary channel operating on a frequency ($f_1$). The CCCH is transmitted on a non-indexed downlink on the frequency ($f_1$). The non-indexed downlink of the primary channel ($f_1$) operates substantially the same as prior art GSM downlinks under GSM specifications. The non-indexed downlink may be used by a MS (10) (FIG. 2) on a slot assigned by the BTS (61) under a TDM format.

The uplink used within the service coverage area (51) of the BTS (61) is indexed (frequency hopped). The uplink used by the BTS (61) is indexed through a frequency set ($f_1$, $f_2$, and $f_3$) that includes the primary channel ($f_1$). The method of frequency hopping on the uplink is similar to the method provided by GSM for conventional frequency hopping of non-primary channels except that, according to the invention, indexing is limited to the uplink and primary and nonprimary channels may be indexed.

Under the embodiment the large geographic area (50) may have assigned frequencies ($f_1, f_2, \ldots f_n$). Frequencies $f_1$, $f_2$, and $f_3$ may be assigned to BTS 61 with frequency $f_1$ designated as primary channel for BTS 61. Frequencies $f_4$, $f_5$, and $f_6$ may be assigned to BTS 62 with frequency $f_4$ designated as primary channels for BTSs 62. Frequencies $f_7$, $f_8$, and $f_9$ may be assigned to BTS 63 with frequency $f_7$ designated as primary channel for BTS 63.

The downlink CCCH of the BTS (61) contains distinctive identification signals as well as synchronization and timing information common to frequencies ($f_1$) and slots of the transmitting BTS (61). Transmitted along with the timing and synchronization information is a nonambiguous frame number (FN) (see GSM Recommendation 5.02, Section 4.3.3). The FN provides a means for associating a long repeat period, incrementing number to time frames. The nonambiguous FN is utilized by the MS (10), in conjunction with other information communicated to the subscriber MS (10) from the BTS (61) such as the hopping algorithm (HSN) used, the set of hopping frequencies (MA), and a user specific number (MAIO) (see GSM Recommendation 5.02, Section 6.2.2) to allow the subscriber MS (10), to determine the specific frequency used for a particular frame. The particular hopping algorithms employed and the prudent assignment of parameters by the cellular system controller (BSC 20) ensures that the instantaneous radio frequencies used by each MS (10) served by a particular BTS (61) are distinct and non-overlapping.

In the above example, MS (10), desiring access to the system, scans for and identifies the CCCH of the BTS (61). The MS (10) monitors for and detects information (FN, HSN, MA, and MAIO) defining a uplink communication resource over which to transmit an access request. Upon transmitting the access request the MS (10) monitors the CCCH on the non-indexed downlink primary channel ($f_1$) for channel assignment messages.

As provided within GSM recommendations, channel assignment messages are communicated from the BTS (61) to the MS (10). These assignment messages, through suitable encoding, provide the user MS (10) with the specific parameters necessary to unambiguously determine the specific frequency and slot in which information between the BTS and MS may be exchanged. If frequency hopping is employed, the frequency list (MA), the algorithm selected (HSN) (for example cyclic or pseudo random hopping), as well as any necessary user identifiers (e.g. MAIO) are provided. The relationship of uplink and downlink radio channels and slots are inferred by the defined 3 slot time offset and 45 MHz frequency offset.

To facilitate the use of this invention, it is necessary to transmit additional command information alerting the MS (10) to employ the proposed half hopping inventive concept. The preferred method for providing this information is to include in every assignment message, a description of both an uplink and a downlink communication resource. In this manner, it is possible to independently describe the communication resource that is to be used for uplink and the downlink transmissions.

Figure 3:
FIG. 3 depicts, according to the invention, concatenated uplink and downlink slots of successive TDM frames used by a mobile subscriber operating on three uplink frequencies.
Figure 3:
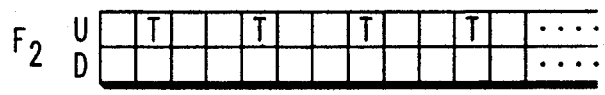
Figure 3:

As an illustration of the inventive concept under the above embodiment, FIG. 3 depicts the receive (R) and transmit (T) frequencies of the MS (10) used for communication between a single transceiver BTS (61) and MS (10) where 3 frequencies (MA=3) are allocated for an indexed uplink and cyclic hopping (HSN=0) is selected. While the example depicts a single transceiver and 3 hopped frequencies ($f_1$, $f_2$, and $f_3$) used for the uplink, the invention may also be extended to any number of hopped frequencies and any transceiver complement imaginable. Also, while cyclic hopping is shown, the invention also operates equally well for pseudo-random frequency hopping (HSN≠0).

In the case of the single transceiver at the BTS (61), it is necessary that the receiver in the base transceiver have the capability of changing receive frequencies rapidly. When multiple transceivers are used, baseband hopping techniques, as are known, may be applied.

Since a non-hopping primary radio channel exists at the BTS (61) for the downlink, the desirable system control attributes of GSM are maintained. The non-hopping primary radio channel provides a BTS carrier beacon for MS selection, measurement, and identification procedures.

In another embodiment of the invention BTSs (61, 62, and 63) transmit the non-indexed downlink signal on a designated antenna of a pair of diversity antennas (22 or 23) (FIG. 1) located at the BTS (61, 62, and 63). The selection of the designated antenna for each TDM slot (0–7) is determined by the BTS (61, 62, and 63) based upon feedback, signal quality factor information communicated from a served MS (10 or 11) on an associated control channel.

In a further embodiment, the feedback information is obtained by modifying each TDMA uplink slot to contain an extra bit of information. The use of the bit is controlled by an MS (10 or 11) operating on an assigned communication resource based on assessments of quality. The assessments of quality the MS (10 or 11) makes of the BTS downlink signal, may be, for example, received signal strength or estimated bit error rate. The extra bit of information is received by the serving BTS and used to control the BTS's selection of antenna (22 or 23) used for each corresponding downlink slot of the communication channel.

In a further embodiment, an MS (10 or 11) measures a signal quality factor for an assigned slot. The MS (10 or 11) determines whether a particular quality threshold has been exceeded. If, due to poor signal quality conditions, the threshold is not exceeded then the MS (10 or 11) would set the bit indicating poor signal quality conditions to the BTS (61, 62, or 63). The BTS (61, 62, or 63), in response to the set bit, would attempt to remedy the situation by switching to the other antenna for its next transmitted slot to the MS (10 or 11). The BTS (61, 62, or 63) would continue switching antennas until the signal from one antenna exceeded the signal quality threshold at the MS (10 or 11), causing it to omit transmission of the extra bit. Omission of the extra bit would cause the BTS (61, 62, or 63) to lock to the better quality antenna.

In an alternative embodiment, the MS (10 or 11) would explicitly control the selection of the BTS transmit antenna. It would set the extra bit if it wanted antenna 22 to be selected or clear the extra bit if antenna 23 is to be selected. The subscriber MS (10 or 11) could use a simple threshold approach or average the signal quality factor (or factors) across multiple bursts.

In yet another embodiment, the MS (10 or 11) could determine that it was receiving adequate signal strength from either antenna (22 or 23). This would cause the MS to set the feedback bit in a manner to cause the BTS (61, 62, or 63) to alternate the transmit antenna (22 or 23) on consecutive downlink slots to that particular MS (10 or 11). Alternating the transmit antenna (22 or 23) on consecutive downlink slots would improve the measurement capabilities of other MSs (10 or 11) that are using the BTS (61, 62 or 63) downlink signal as a measurement beacon.

I claim:

1. A cellular communication system comprising:

A) a plurality of base sites, each having a service coverage area and each having a primary channel and plurality of non-primary channels; and B) a base site of the plurality of base sites and a communication unit located within the service coverage area of the base site having means for exchanging a communicated signal on a primary channel having a frequency hopped uplink and a non-frequency hopped downlink or a non-primary channel having a frequency hopped uplink and a frequency hopped downlink.

2. The system as in claim 1 wherein the means for exchanging communicated signals on the non-frequency hopping downlink further comprises a means for monitoring a downlink signal from an at least one other base site.

3. The system as in claim 2 wherein the means for monitoring a downlink signal from an at least one other base site further comprises means for measuring a signal quality factor of the monitored signal and means for detecting an ID of the monitored signal.

4. The cellular communication system of claim 1 further comprising:

C) means for transmitting, by the base site, the communicated signal within a TDM frame selectively through a designated antenna of a first and at least a second antenna located at the base site;

D) means for measuring, by the communication unit, signal quality factor information of the communicated signal from the designated antenna for the communicated signal; and E) means for changing the designated antenna for the communicated signal, based, in part, upon said signal quality factor information.

5. The apparatus as in claim 4, wherein the means for changing the designated antenna further includes means for determining that the signal quality factor has exceeded a threshold.

6. The apparatus as in claim 4 wherein the signal quality factor information includes measuring signal strength.

7. The apparatus in claim 4 wherein the signal quality factor information includes measuring a bit error rate.

8. The system as in claim 4 further including means for receiving a resource allocation on a control resource from the base site.

9. The system as in claim 4 further including means for exchanging a communicated signal on the allocated resource between the communication unit and base site.

10. The system as in claim 4 wherein the means for changing the designated antenna includes means for comparing the measured signal quality factor with a threshold by the communication unit and upon occasion that the signal quality factor exceeds the threshold setting a bit on a next uplink transmission.

11. The system as in claim 4 further including means for communicating the signal quality factor of the designated antenna to the base site on the allocated resource.

12. The system as in claim 11 wherein the means for communicating include means for communicating the signal quality factor information on an indexed uplink.

13. A method of improving signal quality of a communicated signal exchanged within a cellular communication system between a base site and a communication unit, such method comprising the steps of:

A) transmitting, by the communication unit, a communicated signal to the base site on a frequency hopped uplink of a communication resource; and B) receiving, by the communication unit, the communicated signal from the base site on either a non-frequency hopped downlink of the communication resource if the downlink is a primary radio channel or a frequency hopped downlink of the communication resource, if the downlink is a non-primary channel.

14. The method as in claim 13 further including the step of monitoring a downlink signal from an at least one other base site.

15. The method as in claim 14 further including the step of measuring a signal quality factor of the monitored signal and detecting an ID of the monitored signal.

16. The method as in claim 15 further including the step of communicating a measured signal quality factor to the base site.

17. The method of claim 4, wherein the base site includes a first and at least a second transmission antenna, further comprising the steps of:

C) transmitting, by the base site on the communication resource, a TDMA signal having a plurality of slots within a TDMA frame and with each slot of the TDMA signal transmitted through a designated antenna of the first and the at least a second transmission antenna located at the base site;

D) receiving the TDMA signal by the communication unit and measuring a signal quality factor; and E) transmitting the measured signal quality factor from the communication unit to the base site for selecting an antenna of the first and the at least a second transmission antenna.

18. The method as in claim 17 further including the step of communicating a resource request on a control resource to the base site.

19. The method as in claim 18 further including the step of receiving a resource allocation on a control resource from the base site.

20. The method as in claim 19 further including the step of exchanging a communicated signal on the allocated resource between the communication unit and base site.

21. The method as in claim 20 further including the step of communicating an identity of the selected optimum antenna to the base site on the allocated resource.

* * * * *